United States Patent [19]

Werth et al.

[11] Patent Number: 4,550,431

[45] Date of Patent: Oct. 29, 1985

[54] ADDRESS SEQUENCER FOR PATTERN PROCESSING SYSTEM

[75] Inventors: Larry J. Werth, Eagan; Larry G. Paulson, Moundsview, both of Minn.

[73] Assignee: Pattern Processing Technologies, Inc., Minneapolis, Minn.

[21] Appl. No.: 464,588

[22] Filed: Feb. 7, 1983

[51] Int. Cl.[4] ............................................. G06K 9/00
[52] U.S. Cl. ...................................... 382/1; 364/200; 382/37
[58] Field of Search .................. 382/1, 10, 14, 15, 30, 382/33, 34, 36, 37; 343/5 DP; 364/147, 136, 140; 358/135, 210, 261

[56] References Cited

U.S. PATENT DOCUMENTS

| | | | |
|---|---|---|---|
| 3,074,050 | 1/1963 | Schultz | 340/146.3 |
| 3,167,746 | 1/1965 | Reines et al. | 340/146.3 |
| 3,504,164 | 3/1970 | Farrell et al. | 235/150 |
| 3,539,994 | 11/1970 | Clapper | 340/146.3 |
| 3,579,252 | 5/1971 | Goodman | 178/7.85 |
| 3,737,852 | 6/1973 | Robinson | 340/146.3 WD |
| 3,816,722 | 6/1974 | Sakoe et al. | 235/152 |
| 3,846,752 | 11/1974 | Nakano et al. | 340/146.3 Q |
| 3,879,728 | 4/1975 | Wolff | 343/5 MM |
| 4,014,000 | 3/1977 | Uno et al. | 340/146.3 MA |
| 4,028,673 | 6/1977 | Taylor et al. | 340/136.3 R |
| 4,032,889 | 6/1977 | Nassimbene | 340/146.3 E |
| 4,110,737 | 8/1978 | Fahey | 340/146.3 Q |
| 4,131,943 | 12/1978 | Shiraogawa | 364/200 |
| 4,164,728 | 8/1979 | Marsh | 340/146.3 Q |
| 4,254,400 | 3/1981 | Yoda et al. | 340/146.3 MA |
| 4,277,775 | 7/1981 | Nally et al. | 340/146.3 Q |
| 4,295,121 | 10/1981 | Enser et al. | 340/146.3 MA |
| 4,295,198 | 10/1981 | Copeland et al. | 364/515 |
| 4,305,130 | 12/1981 | Kelley et al. | 364/513 |
| 4,355,301 | 10/1982 | Isshiki et al. | 382/37 |
| 4,484,265 | 11/1984 | Czekalski | 364/200 |

OTHER PUBLICATIONS

J. S. Griffith, *Mathematical Neurobiology*, 1971, Chapter 8.

*Primary Examiner*—Leo H. Boudreau
*Attorney, Agent, or Firm*—Kinney & Lange

[57] ABSTRACT

An address sequencer produces an address stream which includes a plurality of interleaved sequences of addresses. Each sequence is a function of input data which is received when an input pattern is sampled by that sequence, so that a repetitive address loop is generated which characterizes the pattern. The address sequencer includes a shift register with a programmable feedback circuit which provides a feedback bit to the first stage of the shift register based upon bits from selected stages of the shift register. During each operating cycle of the address sequencer, a counter provides a sequence identification number which identifies a particular sequence. A stored address selected by the sequence identification number is provided as the present address for that sequence (and the output of the address sequencer). In addition, the shift register is loaded with a multibit word derived from that stored address. The shift register is then shifted a predetermined number of times, and the feedback bit is derived from stages of the shift register which are selected based upon the sequence identification number. The next address of the sequence is derived from the contents of the shift register after the shifting and is selected based upon a comparison of the input data (which was received in response to the present address) with a reference value.

35 Claims, 3 Drawing Figures

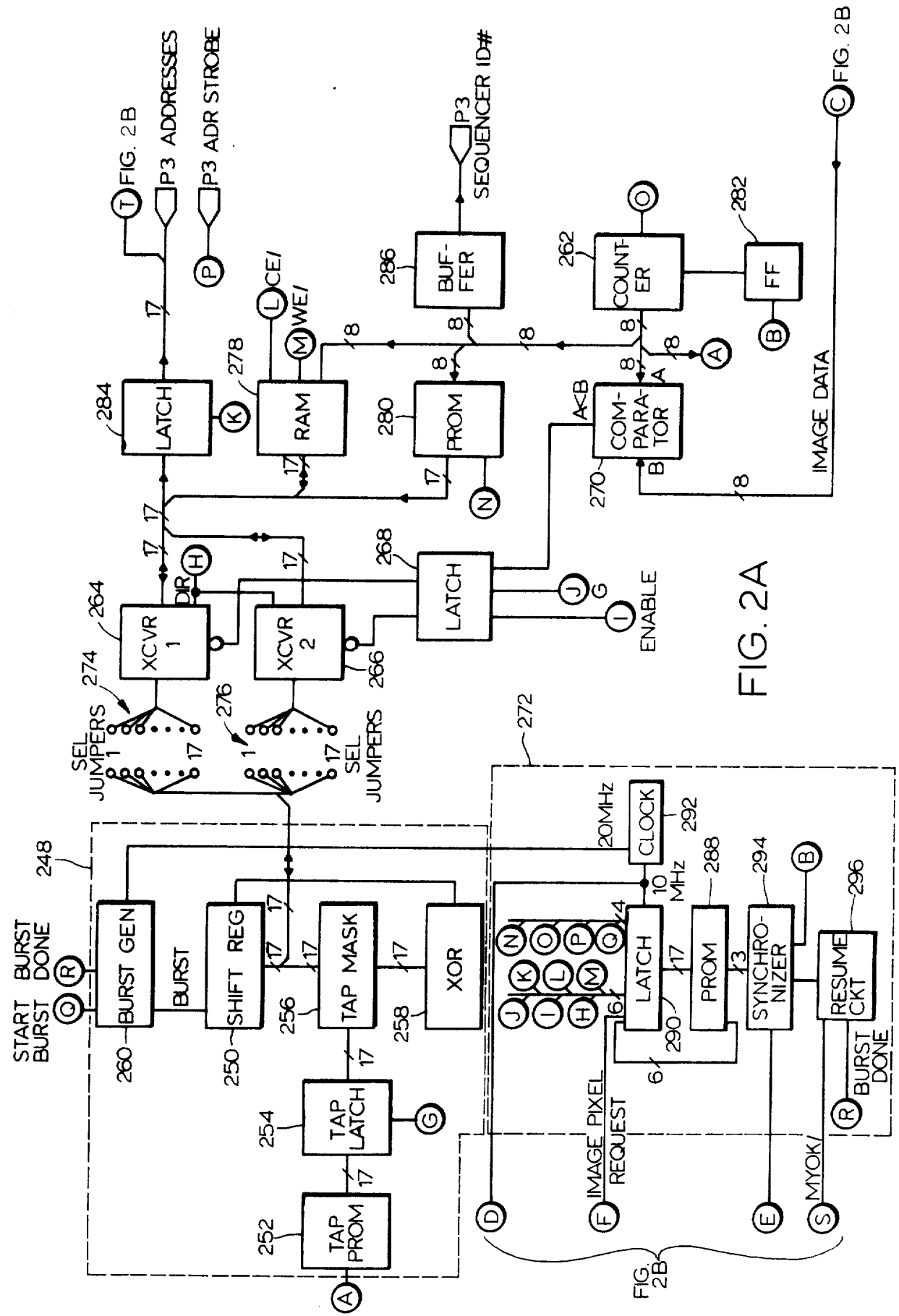

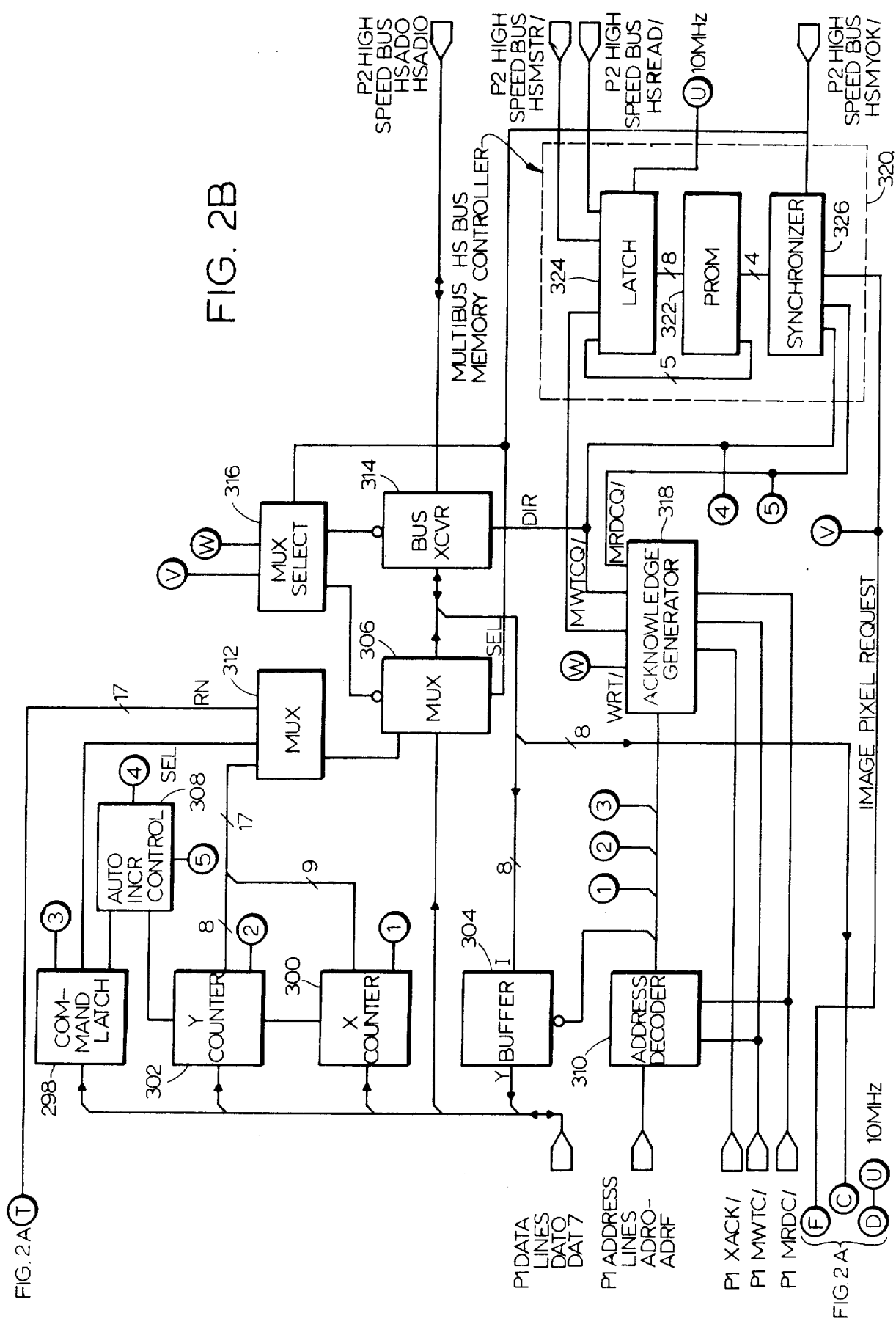

ADDRESS SEQUENCER FOR PATTERN PROCESSING SYSTEM

REFERENCE TO COPENDING APPLICATIONS

Reference is hereby made to the following copending applications and patent which are assigned to the same assignee: Pattern Processing System, Ser. No. 465,008, filed Feb. 8, 1983; Training Controller for Pattern Processing System, U.S. Pat. No. 4,504,970; and Response Detector for Pattern Processing System, Ser. No. 464,624, filed Feb. 7, 1983.

BACKGROUND OF THE INVENTION

1. Field of the Invention

This invention relates to systems for identifying images or patterns by means of an address stream. In particular, this invention relates to an address sequencer for producing the address stream.

2. Description of the Prior Art

Digital electronic technology (and particularly digital computers) has changed almost every facet of modern life. In spite of the ever-increasing use of digital technology, life still goes on in an analog fashion. Visual, tactile, and audio images still comprise the bulk of sensory experiences for human beings. Full exploitation of digital technology has been limited by the ability to convert these analog images to digital data and to distinguish the images from each other.

Converters which can digitize a visual image or a series of sounds are now commonplace. Any audio or visual image can be converted to an array of digital data. The problem is, however, to deal with that data in a meaningful manner.

Conventional pattern or image recognition technology has serious speed limitations which in general originate from the use of conventional digital computer processing architecture. This architecture requires the use of serial processing algorithms which do not easily accommodate large amounts of parallel information.

Two methods are commonly used in the prior art to recognize patterns: "template matching" and "feature extraction". In the template matching method, a reference pattern is stored for each response. Each input image is then compared with each reference pattern until a match is found. The number of reference patterns which can be recognized is obviously limited, since substantial time and memory is required to serially search for a match. Because of practical limitations on speed and memory this technology cannot accommodate applications such as natural speech input, visually guided motion, or object tracking.

The feature extraction method attempts to speed up this process. Rather than match an entire image, a small set of features is extracted from the image and compared to a reference set of features. This method can be very complex, as well as time-consuming. An example of the complexity involved in the feature extraction technique is the problem of recognizing a person's face. The difficulty of defining the features of a person's face mathematically and then writing a procedure to recognize these features in an image is overwhelming.

Most conventional approaches to pattern recognition represent information from images in a format which is incompatible with spatial or temporal integration. For example, each image type or image source typically has unique processing algorithms, and the results are not easily combined. In speech, for example, there is generally no common representation of information from the acoustic level to the word, phrase, or semantic levels (temporal integration). As a result, conventional speech recognition methods typically deal with incompatible information formats at every level. Severe processing demands are made in order to accommodate this situation. In the case of multiple visual images (e.g. one image for each primary color or one image from each camera) the descriptive language (information format) from each image is not easily combined to describe a single image identity (spatial integration). In another more obvious example the descriptive language typically used for the visual image of an object (areas, perimeters, etc.) is certainly incompatable with the descriptive language for the sound which the object may be producing.

Conventional techniques generally require special computer programming to suit each specific application. Each application frequently requires: a detailed analysis of the expected input images to identify their differences; the development of a model (usually mathematical) to define the differences in computer language; and development of generally complex methods to extract the features from the images. This requires skilled personnel to specify and program the complex algorithms on digital computers, and also requires expensive computer programming development facilities. This development process generally must be repeated for each new type of input images.

In those applications where the input images can be totally specified, conventional technology has generally been successful. An example is the field of optical character recognition, which has been the object of considerable research and development over the past twenty-five years. On the other hand, in those applications which deal with time varying images which frequently cannot be prespecified, the conventional technology either has failed to provide technical solutions, or has resulted in extremely complex and expensive systems.

There is a continuing need for improved pattern recognition systems in many fields including speech recognition, robotics, visual recognition systems, and security systems. In general, the existing pattern recognition systems in these fields have had serious shortcomings which have limited their use.

SUMMARY OF THE INVENTION

The present invention is an address sequencer which generates sequences of addresses in which the next address of each sequence is based upon input data received in response to at least one previous address of the sequence. The address sequencer of the present invention is particularly useful in a pattern processing system which identifies an image input pattern based upon an address loop (or loops) generated when individual values of the input pattern are addressed.

In its simplest form, the address sequencer of the present invention generates a sequence of addresses by providing a multi-bit address and providing input data in response to that multi-bit address. The address sequencer includes shift register means for containing bits in a plurality of stages. The contents of the shift register means are related to the multi-bit address which has been provided. The shift register means is then caused to shift the bits by a predetermined number of stages. Each time the bits are shifted by one stage, a feedback bit is loaded into the first stage of the shift register means. This feedback bit is a function of bits from selected stages of the shift register means, so that the contents of the shift register means after the shift are a function of the contents prior to the shift. The next address of the sequence is selected as a function of the input data, and is derived from the contents of the shift register means after the shift by a predetermined number of stages.

In preferred embodiments, the address sequencer of the present invention generates an address stream which includes a plurality of interleaved sequences of addresses. In these embodiments, the address sequencer includes means for providing a sequence identification number which identifies a selected sequence of the plurality of interleaved sequences. A "present" address of the selected sequence is provided in response to the sequence identification number, and input data is provided in response to that present address. The contents of the shift register means are initially based upon the present address of the selected sequence. The contents are then shifted by a predetermined number of stages.

The address sequencer also includes means for deriving bits from selected stages of the shift register means as a function of the sequence identification number. Means for feeding back the feedback bit into the first stage of the shift register means produces the feedback bit as a function of the bits derived from the selected stages. The next address in the selected sequence is selected as a function of the input data received in response to the current address and the contents of the shift register means after the contents have been shifted by a predetermined number of stages. This selected next address is then stored by storage means for use the next time the sequence identification number is provided.

In these embodiments, the address sequencer functions, in effect, as a plurality of address sequencers operating in a multiplexed fashion. The number of different sequences in the address stream is determined by the total number of sequence identification numbers which are used.

BRIEF DESCRIPTION OF THE DRAWINGS

FIGS. 2A and 2B are an electrical block diagram of the address sequencer in the system of FIG. 1.

DETAILED DESCRIPTION OF THE PREFERRED EMBODIMENTS

Figure 1:
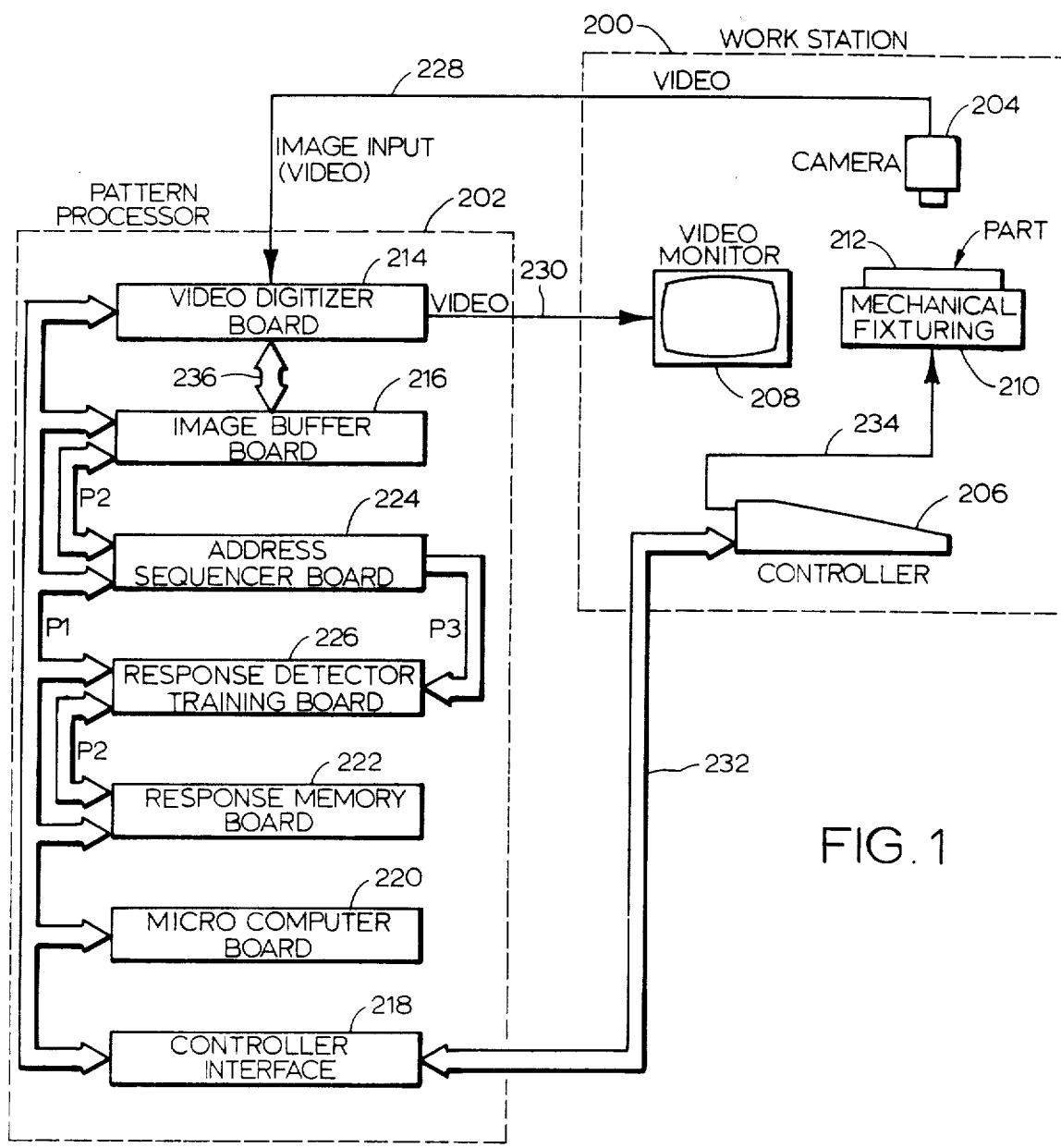
FIG. 1 is an electrical block diagram of a pattern processing system utilizing the address sequencer of the present invention.

The present invention is based upon the generation of address loops which characterize an image input pattern. These address loops are used to identify the image input pattern which is present. The address loops are produced by means of the address sequencer of the present invention, which generates an address stream containing a plurality of interleaved sequences of addresses. Each sequence is a function of input data received in response to the addressing of the image input pattern. Each address of the sequence is based upon a preceding address and the input data received in response to that preceding address. The operation of the address sequencer is consistent so that once an address of the sequence is repeated, the sequence is in an address loop and will remain in that loop as long as the image input pattern remains unchanged.

As described in the previously-mentioned copending patent application entitled "Pattern Processing System", the generation of address loops achieves a large data reduction which can be used to great advantage in a wide variety of pattern processing applications. The present invention is a particularly advantageous address sequencer which generates the address stream which contains the address loops. To provide a better appreciation of the operation of the present invention, the following detailed description includes a discussion of an overall system, rather than just the circuitry forming the address sequencer.

The present invention has applicability to a wide range of different pattern processing requirements. These include speech recognition, visual image recognition, robotics, and security and surveilance. The following discussion will deal specifically with one advantageous application of the present invention to visual monitoring, but it will be understood that the present invention is not limited to this particular application.

FIG. 1 shows a preferred embodiment of a system for video inspection and monitoring which includes work station 200 and pattern processor 202. Work station 200 includes video camera 204 (which acts as an image source), controller 206, video monitor 208, mechanical fixturing 210, and part 212 (which is manipulated by mechanical fixturing 210 and is monitored by means of video camera 204). Pattern processor 202 includes various printed circuit boards (video digitizer board 214, image buffer board 216, controller interface board 218, microcomputer board 220, response memory board 222, address sequencer board(s) 224, and response detector/training board 226).

Analog video signals are supplied by video camera 204 to video digitizer board 214 by cable 228. Analog video signals are supplied to video monitor 208 from video digitizer board 214 by cable 230.

Cable 232 provides communication back and forth between controller 206 at work station 200 and controller interface board 218 of pattern processor 202. Controller 206 also provides control signals to mechanical fixturing 210 to control mechanical manipulation part 212 through control lines 234. Controller 206 preferably includes a keyboard (not shown) which allows the operator to enter data, training codes, and other control information, and to select operating modes.

(1) WORK STATION 200

The work station 200 operates in one of two modes: a training mode or an operating mode. In the training mode, the operator is teaching pattern processor 202 the task to be performed later when work station 200 is in the operating mode. Three examples of such tasks are: visual monitoring of a continuous process, visually guided movement, and part inspection for defects. Many applications of the present invention require all three types of tasks to be performed.

For example, in the visual monitoring task, the operator has trained pattern processor 202 to monitor a continuous process or sequence of processes and respond by directing the process, or to detect deviations from normal operation. In many applications, this involves monitoring a high speed process and responding immediately to malfunctions, such as parts becoming jammed. When the operating mode is selected, deviations from the normal functions are quickly detected by pattern processor 202 and appropriate action (e.g. in the form of control signals to a mechanical fixturing 210 or a visual or audible annunciator signal) is taken by the controller 206.

For the task of visually guided movement, input patterns are associated with response codes which command a movement of, for example, part 212, a tool (not shown), or camera 204. In many applications part 212 cannot be adequately positioned by fixturing 210 for subsequent operation such as assembly, or inspection because of limited fixturing tolerances. In those cases, pattern processor 202 is trained to respond with a code representing the magnitude and direction of the displacement required to correct the positions of part 212 or camera 204.

Since pattern processor 202 can be trained to respond with an object's identity and its displacement at high speeds, pattern processor 202 can provide the necessary responses for controller 206 to identify and track a moving object. In this visually guided movement task, controller 206 maintains a maximum response of the object's identity code by directing movements to compensate for the displacements. One application is to identify and track a moving target in surveillance applications.

In still another visually guided movement task, each visual image of an object is trained to respond with a code directing the next move of that object. In this case, visually guided motion can provide proper alignment for mating parts in automated assembly operations or, for example, can move a tool to a specific point on a part.

For a visual inspection task, such as inspection of a part 212 (e.g. an assembled printed circuit board), the operator trains pattern processor 202 by assigning training codes through controller 206 as camera 204 views various inspection points of a correctly completed circuit board. During the operating mode, a simple program in controller 206 initiates programmed actions depending upon the response codes from pattern processor 202. These actions include: initiate the inspection task if a part is present, inform the operator of a defective inspection point, initiate a move to the next inspection point, signal when the inspection task is completed, and allow the operator to update training for an inspection point if a failure indication is determined by the operator to be an acceptable variation. A defect at an inspection point is determined from the total counts accumulated by the response detector in a histogram for the code assigned to that inspection point. If the count is less than that observed during training, the inspection point is defective.

(2) PATTERN PROCESSOR 202

Pattern processor 202 associates desired training codes with input patterns based upon address loops generated during the training mode, and later produces a response output based upon the address loops generated when the same input patterns are presented during the operating mode. Video digitizer board 214 digitizes the analog video signal from video camera 204, and that digitized data is stored by image buffer board 216. Address sequencer board 224 generates an address stream which addresses the data stored in image buffer board 216. The values read out from image buffer board 216 in response to the address stream are used by address sequencer board 224 in generation of later addresses. The address stream also addresses response memory board 222. During the training mode, codes are written into selected addressed locations of response memory board 222 by a training controller on board 226. During the operating mode, the codes stored in addressed locations of response memory board 222 are read out, and a response detector on board 226 provides an output based upon the most frequently read out code(s). Controller interface board 218 and microcomputer board 220 interface controller 206 with the circuitry of pattern processor 202 so that training codes are provided from controller 206 to the training controller on board 226 during the training mode and the response outputs are provided from the response detector on board 226 to controller 206 during the operating mode.

The preferred embodiment of pattern processor 202 shown in FIG. 1 is designed using the standard IEEE-796 (Intel multibus) architecture. Each block drawn in solid lines within pattern processor 202 generally represents a single printed circuit board except that in one preferred embodiment address sequencer board 224 is a pair of printed circuit boards (with the circuitry of FIG. 2A on one board and the circuitry of FIG. 2B on the other board). The size of each board and the edge connectors for ports P1 and P2 conform to the IEEE 796 standard. Port P3 is a custom designed port for pattern processor 202.

Port P1 of pattern processor 202 has eighty-six contacts and provides the setup and control communications for pattern processor 202. Controller interface board 218 links controller 206 to port P1 so that individual functions of circuit boards 214, 216, 218, 220, 222, 224 and 226 can be controlled by controller 206.

Port P2 has sixty contacts and provides the high speed access to image buffer board 216 and response memory board 222. This high speed access port is controlled by dedicated logic on address sequencer board 224 and on response detector/training board 226. Each board 224 and 226, therefore, can be considered as having its own high speed port to its dedicated memory.

Port P3 is used to send the address stream generated by address sequencer board 224 to response detector/training board 226.

Ports P1, P2 and P3 are input/output (I/O) edge or pin contacts on the printed circuit boards. In addition to these contacts, there are video input and output connectors on video digitizer board 214 and an IEEE-488 connector on controller interface board 218.

Basically, the internal architecture of pattern processor 202 uses the IEEE 796 standard, to permit compatibility with a wide range of off-the-shelf printed circuit boards for memory, terminal interfaces, microcomputer boards, graphics, and many other functions of digital systems. Of the circuit boards 214–226, only address sequencer board(s) 224 and response detector/training board 226 are custom designed. Video digitizer board 214, microcomputer board 220, controller interface board 218, and response memory board 222 are preferably commercially available circuit boards. In addition, image buffer board 216 is preferably a commercially available circuit board which is modified only so far as necessary to permit high speed access through the P2 port.

Externally, pattern processor 202 preferably interfaces to video camera 204 and video monitor 208 utilizing an industry-wide video standard. This permits use of a wide range of different cameras, monitors, and recorders with pattern processor 202.

In addition, controller interface board 218 utilizes the IEEE-488 standard, which is widely used in manufacturing environments for process control and testing. Pattern processor 202, therefore, is capable of use in conjunction with a wide variety of existing manufacturing systems which already utilize the IEEE-488 interface.

(A) VIDEO DIGITIZER BOARD 214

Video digitizer board 214 digitizes the analog video signal from video camera 204 and makes the digitized data available for storage in image buffer board 216. An entire image of information (called a frame) is digitized thirty times a second. Video digitizer board 214 also converts the digitized data stored in image buffer board 216 back to an analog video signal for display on video monitor 208. Video monitor 208, therefore, displays the contents of image buffer board 216. The setup and control functions of video digitizer board 214 are directed from controller 206 through controller interface board 218 and the P1 port.

Image buffer board 216 grabs a frame of data from video digitizer board 214 at its option. A cable 236 is connected directly between on-board connectors of video digitizer board 214 and image buffer board 216 to permit the transfer of digitized data.

In one preferred embodiment of the present invention, video digitizer board 214 is a Model VAF-512 video digitizer circuit board from Matrox Company. The Model VAF-512 converts a frame of video into 128K points each having sixteen possible levels of intensity (i.e. sixteen grey levels).

In another embodiment, video digitizer board 210 is a Model VG-121 digitizer circuit board from Data Cube Corporation. The Model VG-121 converts a frame of video into 128K points and sixty-four grey levels. The VG-121 circuit board includes both a video digitizer and an image buffer on the same circuit board, and in that case video digitizer board 214 and image buffer board 216 form a single circuit board.

(B) IMAGE BUFFER BOARD 216

Image buffer board 216 grabs a frame of data from video digitizer board 214, stores the data in its memory, and makes the data available to address sequencer board 224 through the P2 port. Each element stored in image buffer board 216 is addressable through the address lines of the P2 port.

Many commercially available image buffer boards also provide some graphics functions. These graphics functions permit the image on video monitor 208 to be manipulated. For example, the operator may want to inspect subregions of an image more closely. With the assistance of graphics functions such as line drawing or zooming, The operator can more easily define subregions for more detailed inspection by pattern processor 202. In preferred embodiments, image buffer board 216 (with graphics functions) is a Matrox Model RGB Graph or a Data Cube Model VG121. The only modifications required to either of these boards for use in pattern processor 202 are those required to provide high speed access through the P2 ports.

(C) CONTROLLER INTERFACE BOARDS 218/MICROCOMPUTER BOARD 220

These two circuit boards work together to interface the standard IEEE-488 cable 232 from controller 206 to the multibus P1 port. Microcomputer board 220 intercepts commands from controller 206, via the controller interface 218, and loads the appropriate memory registers located on the various boards which are connected to port P1. In addition, microcomputer board 220 receives information from the boards and reformats it to send it to controller 206 via controller interface 218 and cable 232.

Microcomputer board 220 also provides signals through port P1 to control the refresh time of image buffer board 216. In addition, microcomputer board 220 provides signals in the form of control words via the P1 port to response detector/training board 226 to control double buffering swap times for the response detector. Further, microcomputer board 220 can be used to perform data analysis tasks on the histogram data received from the response detector on board 226.

(D) RESPONSE MEMORY BOARD 222

The response memory board 222 is preferably a commercially available multibus compatible read/write random access memory having a capacity of, for example, 512K words. Response memory board 222 is capable of being accessed at high speed through both the P1 and P2 multibus ports. Response memory board 222 is available, for example, from Microbar (Model DBR50).

(E) ADDRESS SEQUENCER BOARD 224 (FIGS. 2A and 2B)

Address sequencer board 224 is used to generate interleaved sequences of addresses for access of individual pixels in image buffer board 216. The "next" address in an address sequence is determined by a multibit number from a pseudorandom number generator 248 and the grey level of the pixel corresponding to the "present" address. If the grey level of the present pixel is above a reference value, one combination of the number's bits will be used as the next address; if the grey level is equal to or below the reference value, another combination of the bits is used. Each grey level can therefore be represented as a binary image, i.e. either the pixel's value is above or below/equal to the reference value. Each grey level image has at least one address sequencer assigned to it.

The operation of address sequencer board 224 is consistent; i.e. the same multibit number from random number generator 248 and the same grey level pixel value always generate the same next address. This characteristic is a key to the generation of address loops which are used by pattern processor 202 to associate a training code with an input image.

As shown in FIG. 2A, shift register 250, tap PROM 252, tap latch 254, tap mask 256, exclusive OR (XOR) network 258, and burst generator 260 form pseudorandom number generator 248. Shift register 250 is a seventeen stage parallel-in/parallel-out shift register. Exclusive OR feedback from specific shift register stages is provided through tap mask 256 and XOR network 258. Any combination of taps can be selected to provide feedback to shift register 250. Tap mask 256 gates the output lines programmed in tap PROM 252 and supplied through tap latch 254 to XOR network 258. The output of XOR network 258 is fed back to the first stage of shift register 250. Tap PROM 252 is addressed by sequencer ID number counter 262. A multiple shift is used to generate each pseudorandom number to ensure randomness. Burst generator 256 is used to generate a high speed burst of a predetermined number of clock pulses for advancing shift register 250.

By using programmable taps, the characteristics of pseudorandom number generator 248 can be changed in a known fashion. By programming the taps within tap PROM 252 in a multiplexed fashion, the effect is that of many individual pseudorandom number generators each in turn accessing image buffer board 216.

Transceivers 264 and 266, latch 268, and comparator 270 form a select circuit for selecting one of two available combinations of the bits of the pseudorandom number contained in shift register 250, depending upon the grey level value of the present pixel. If the grey level value is greater than or equal to the number stored in counter 262, transceiver 264 is selected. If the present pixel has a grey level value which is less than the number in counter 262, transceiver 266 is selected. Comparator 270 performs this comparison, and latch 268 enables the appropriate transceiver 264 or 266 at the appropriate time, as determined by generator control unit 272. Latch 268 is designed to avoid output clashes between transceivers 264 and 266.

Select jumpers 274 and 276 connect shift register 250 with transceivers 264 and 266, respectively. Select jumpers 274 and 276 are jumped so that each transceiver 264 and 266 delivers a different "scrambled" version of the number contained in shift register 250.

In some embodiments of the present invention, comparator 270 is disconnected from chosen least significant bits of counter 262. This allows multiple cycles of pseudorandom number generator 248 on each grey level plane. In that case, the number contained in counter 262 represents the sequencer ID number (i.e. the identification number of the particular sequence of the address stream which is active), while the bits of that number which are supplied to comparator 270 represent the current grey level plane.

RAM 278 and PROM 280 are involved with "seed" storage. To ensure an orderly and repeatable start from power-up, a set of initial random numbers or "seeds" are stored in PROM 280. These seeds form the very first "present" or "current" address for each of the sequencer ID numbers defined by counter 262. After the first pass through the sequencer ID numbers, the "next address" random numbers which have been stored are subsequently retrieved from RAM 278. Flipflop 282 is set after the first pass (through the sequencer ID numbers), and directs subsequent read accesses to RAM 278. Latch 284 serves to hold the present address (random number) for use in accessing image buffer board 216. Buffer 286 buffers the counter 262 and directs the sequencer ID number to port P3, where it is connected to response detector/training board 226. In some embodiments, the reference value, derived from the sequence ID number is sent to port P3 in place of or in addition to the sequencer ID number.

Generator control unit 272 includes PROM 288, latch 290, clock 292, synchronizer 294 and resume circuit 296. The outputs of PROM 288 are latched by latch 290 with each clock pulse from clock 292. Six lines from latch 290 are brought around to address lines of PROM 288, and allow control unit 272 to "cycle". Other outputs of latch 290 (which are labeled with letters "H" through "Q", are routed to various control points on address sequencer board 224. Outputs H-Q perform such functions as loading and unloading shift register 250 (output Q), selecting the direction of transceivers 264 and 266 (output H), advancing the sequencer ID number contained in counter 262 (output O), controlling seed storage RAM 278 (outputs L and M), controlling seed storage PROM 280 (output N), and controlling latch 268 (outputs I and J). Synchronizer 294 is an optional circuit used to synchronize external signals such as memory acknowledge signals to local clock 292. Resume circuit 296 gates together the acknowledge signal MYOK/ and the BURST DONE signal to restart generator control unit 272 after programmed halts.

During each operating cycle, control unit 272 first causes counter 262 to advance to a new sequencer ID number count. Control unit 272 then causes the stored "seed" address corresponding to the new sequencer ID number to be loaded from RAM 278 (or PROM 280 during initial startup) into latch 284. The output of latch 284 is the address which is supplied through port P3 to response detector/training board 226 and through port P2 (see FIG. 2B) to image buffer board 216.

The image data which is received by comparator 270 is a sample value corresponding to the address contained in latch 284. Comparator 270 compares the image data with the grey level count derived from counter 262 and sets latch 268 and enables the selected transceiver 264,266 to load the seed address from RAM 278 (or PROM 280) into shift register 250.

The sequencer ID number from counter 262 is supplied to tap PROM 252. Control unit 272 enables tap latch 254 to latch the taps from tap PROM 252 which correspond to the sequencer ID number.

Control unit 272 then starts burst generator 260 to cause the contents of shift register 250 to be shifted. During the shifting, feedback to the first stage of shift register 250 is provided by XOR circuit 258 based upon the selected taps.

When the shifting is completed, control unit 272 reverses the direction of the selected transceiver 264 or 266. The new number contained in shift register 250 is scrambled by jumpers 274 or 276 and sent through the selected transceiver 264 or 266 to RAM 278 where it is stored in the location corresponding to the sequencer ID number for use as the address the next time counter 262 returns to that sequencer ID number. The cycle is then complete, and control unit 272 is ready to initiate the next cycle by advancing counter 262 to another sequencer ID number.

The remainder of the address sequencer board(s) 224 is shown in FIG. 2B. Command latch 298 is used by the operator to hold command signals for selecting operating modes of address sequencer board 224. Command latch 298 enables functions such as an auto increment mode, random number mode, user read/write mode, and so on. Command latch 298 resides at a system address in the multibus address space.

X counter 300 and Y counter 302 are used when the operator wishes to perform a direct read or write of the image buffer board 216. Counters 300 and 302 reside within the multibus system address space. To perform a read or write, the operator loads an address into X counter 300 and Y counter 302 (which is similar to X and Y coordinates) and does a read from or a write to the transfer address. Buffer 304 delivers the pixel value during a read operation. During a write operation, the data is multiplexed into image buffer board 216 by multiplexer (MUX) 306. Auto increment control 308 provides an auto increment function which is available in the event that the operator wishes to do reads or writes to sequential memory locations within image buffer board 216.

Address decoder 310 is used to generate chip selects (or enables) for the various circuits which are addressable by the multibus. The base address is set by jumpers (not shown).

Multiplexer 306, multiplexer 312, bus transceiver 314 and multiplexer select circuit 316 provide a multiplexed image buffer interface (i.e. address and data are time-shared on the same lines of port P2). Multiplexer 312 is used to choose either random numbers or the numbers contained in counters 300 and 302 as the address source. Multiplexer 306 is used to select either the address source (multiplexer 312) or the data source (the P1 data lines) for presentation to bus transceiver 314. Bus transceiver 314 is used to drive the image buffer bus (port P2). Multiplexer select circuit 316 enables multiplexer 306 and bus transceiver 314 in such a fashion as to avoid output clashes between multiplexer 306 and bus transceiver 314.

Acknowledge generator 318 is used to generate the XACK/ signal for the multibus port P1 and to qualify the multibus read and write signals (MRDC/ and MWTC/) for use in image buffer memory transfers.

High speed bus memory controller 320 includes PROM 322, latch 324, and synchronizer 326. High speed bus memory controller 320 generates the proper control signals when an access to image buffer board 216 is required. These involve a read, a strobe and an acknowledge line (HSREAD/, HMSTR/, and HSMYOK/, respectively) for the image buffer, and an acknowledge signal for the multibus. An image memory cycle can be initiated either from a multibus access to the image, or from a random number access.

The outputs of PROM 322 are latched by latch 324 with each clock pulse received from clock 292. Five lines of latch 324 are brought around to address lines of PROM 322. These five lines allow high speed bus memory controller 320 to cycle. Other outputs of latch 324 are used for the various memory interface functions. Synchronizer 326 is an optional circuit used to synchronize external signals, such as HSMYOK/, to the local clock.

In summary, the address sequencer board 224 which is shown in detail in FIGS. 2A and 2B generates addresses which access individual pixels of the image contained in image buffer board 216. The next address in the address sequence is a function of the current address together with the grey level of the present pixel which is supplied as image data to comparator 270 in response to the current address. If the grey level of the present pixel is above the reference value derived from the value in counter 262, transceiver 264 is selected to provide one combination of the bits contained in shift register 250. If the grey level is less than the grey level reference value, transceiver 266 is selected, which provides a different combination of the bits contained in shift register 250. The reference value generated by counter 262, therefore, defines "grey level planes", each of which can be processed by address sequencer board 224. In addition, the count contained in counter 262 represents a sequencer ID number used to control pseudorandom number generator 248.

Pseudorandom number generator 248 includes shift register 250 together with exclusive OR feedback taken from specific shift register stages by tap mask 256 and exclusive OR circuit 258. In this embodiment the taps are chosen by tap PROM 252 based on the sequencer ID number so as to generate maximal length sequences. By using progammable taps, address sequencer board 224 can change the characteristics of pseudorandom number generator 248 in a known fashion. By programming the taps in a multiplexed fashion, the effect is that of many individual random number generators each in turn accessing the image buffer board 216. This greatly enhances the resolution of pattern processor 202, since the multiplexed random number generators are in effect operating in parallel. Seed storage RAM 278 is provided to save the generated address until its next turn in the multiplex cycle. This ensures that the operation of pseudorandom number generator 248 is consistent and predictable.

In other embodiments of the present invention, all address sequencer numbers are assigned to each grey level plane so that every plane is referenced in each of the multiplexed sequences. As a result, an immunity to variations in general light intensity is exhibited for visual patterns. A specific grey level image will cause the same address loops to be generated even though the level has changed because the same patterns will exist but on different grey level planes.

Address sequencer board 224 also includes circuitry necessary to manage the interface to image buffer board 216, to multibus ports P1 and P2, and to response detector/training board 226. By means of X and Y counters 300, 302 and the related circuitry shown in FIG. 2B, the operator is permitted to write to or read from image buffer board 216. This is particularly useful in testing image buffer board 216 and also in loading up contrived image patterns.

(F) RESPONSE DETECTOR/TRAINING BOARD 226

Response detector/training board 226 consists of two main sections: a training controller and a response detector. During the training mode, the training controller writes to response memory board 222 based upon training codes received from controller 206. During the operating mode, the response detector reads from response memory board 222 and produces a response output. The construction and operation of response detector/training board 226 is described in detail in the previously-mentioned copending applications, and that description is incorporated herein by reference.

To understand the operation of the training controller and the response detector, the nature of the address stream from address sequencer board 224 (which is supplied on port P3) must first be considered. As described previously with reference to FIGS. 2A and 2B, address sequencer board 224 functions as though it consisted of many individual address sequencers operating in a multiplexed fashion. Each sequence has an identifying number (i.e. the sequencer ID number from buffer 286) and each sequence's output address is interleaved with the other output addresses. The P3 port lines include address lines, sequencer ID lines, and control lines. In one embodiment, for example, if sixteen address sequences are active, the sequencer ID number from buffer 286 increments from "0" to "15" and back to "0" as each sequence in turn places its output in the address stream. In other embodiments, the sequencer ID numbers are presented in other than numerical order. In general, each sequence is associated with one grey level in the image, although as discussed previously, it is possible (and in some applications desirable) to provide more than one sequence per grey level if desired. In such applications, it may be advantageous to send the grey leve reference value to P3 in place of or in addition to the sequence ID number. Each sequence can be considered to be operating independently of the other sequences and thus forming its own address loops.

Response detector/training board 226 receives the address stream and its associated control lines from address sequencer board 224 through the P3 port. The address stream occurs continuously (except during image frame grabbing if image buffer board 216 does not have double buffering capabilities). Response detector/training board 226 accepts and synchronizes with the address stream. When the address stream stops, response detector/training board 226 stops. If response detector/training board 226 stops, it has no effect on the address stream or on address sequencer board 224. In other words, response detector/training board 226 is entirely passive with respect to address sequencer board 224. This allows response detector/training board 226 to operate as an independent module.

The basic function of the training controller is to write training words into response memory board 222. Most of the circuitry of the training controller involves determining when in the address stream from address sequencer board 224 the writing of training words should occur. Commands for setup and control originate from controller 206 and are sent via the multibus P1 port to various registers of the training controller. Microcomputer board 220 controls the actual loading of the various registers of the training controller, and the registers are essentially memory locations within the addressable memory space of microcomputer board 220.

Training controller 350 receives control lines, address lines, and sequencer ID number lines from the P3 port. Data, address and read/write lines are provided through the P2 port to response memory board 222.

The response detector determines (i.e. detects) the identity (i.e. response) of the image presented to pattern processor 202. It does so by continually reading the contents of the response memory board 222 which are addressed by the address stream from address sequencer board 224 and by identifying the most frequently occurring codes being read. If the image present at image buffer board 216 is the same or similar to the image presented during training, then the address stream will be similar, and the codes read out from response memory board 222 in response to that address stream will be similar. The response detector, therefore, will identify the code which was used during training. For a static image, the address stream will always be repetitive and will contain a small subset of the total set of possible addresses. As long as the image is present, therefore, the same sets of addresses will be accessed and the same response codes will be detected.

The response detector receives only the contents of response memory board 222 which are addressed by the address stream. The response detector does not deal with the address stream itself. As the address stream is controlled (for example turned on or off), the response codes sent to the response detector also turn on and off.

The response detector is set up and controlled by commands which are sent from controller 206 through port P1 and which are stored in various registers of the response detector. The registers are within the addressable memory space of microcomputer board 220, and read and write operations occur through the multibus P1 port.

(G) INCREASED VOCABULARY AND RESOLUTION CAPABILITIES

One important advantage of pattern processor 202 described in FIG. 1 is the modular nature of its architecture. As discussed previously, response detector/training board 226 and response memory 222 are entirely passive with respect to address sequencer board 224. As a result, larger response vocabularies are possible by use of multiple response detector/training boards 226 and multiple corresponding response memory boards 222. Since the modules operate independently, they can all be placed on the multibus to provide additional response memory space and thus permit more space for different training codes.

Increased resolution can also be achieved by use of multiple image buffer boards 216 and address sequencer boards 224. Resolution is increased because additional sample points are continually being sampled from the same image, and the total address stream is therefore more sensitive to changes in fewer pixels (image element). Each additional module which includes an image buffer board 216 and an address sequencer board 224 normally requires an additional response detector/training board 226 and response memory board 222. This is because the response detector/training board 226 and the response memory board 222 accept only one address stream. The addition of another response detector/training board 226 and response memory board 222 in order to achieve greater resolution also provides a larger response vocabulary.

(H) CONCLUSION

The pattern processor of the present invention is an extremely powerful tool for a wide variety of different pattern recognition applications. The generation of address loops by the address sequencer provides a dramatic reduction in data which permits the association of a desired response with an image input. As a result, the present invention provides much faster response to complex input images than has been possible using conventional image processing techniques.

The address sequencer board 224 of the present invention provides an address stream which is effectively the multiplexed output of multiple pseudorandom number generators. This permits grey level pattern processing, and provides significant increases in resolution and noise immunity.

Although the present invention has been described with reference to preferred embodiments, workers skilled in the art will recognize that changes may be made in form and detail without departing from the spirit and scope of the invention.

What is claimed is:

1. Apparatus for generating an address stream which includes a plurality of interleaved sequences of addresses, the apparatus comprising:

means for providing a sequence identification number which identifies a selected sequence of the plurality of sequences;

means for providing an address of the selected sequence in response to the sequence identification number;

means for providing input data in response to the address of the selected sequence;

shift register means for containing bits in a plurality of stages, the bits being initially based upon the address of the selected sequence;

means for shifting the contents of the shift register means by a predetermined number of stages;

means for deriving bits from selected stages of the shift register means as a function of the sequence identification number;

means for feeding back a feedback bit into the shift register means, the feedback bit being a function of the bits derived from the selected stages;

means for selecting a next address in the selected sequence as a function of the input data and the contents of the shift register means after the contents have been shifted by a predetermined number of stages; and means for storing the selected next address for use when the sequence identification number is again provided.

2. The apparatus of claim 1 wherein the means for selecting comprises:

means for comparing the input data and a reference value and providing a first comparator output when the input data and the reference value have a first relationship and a second comparator output when the input data and the reference value have a second relationship; and select means for selecting a first arrangement of the contents of the shift register means as the next address in response to the first comparator output and a second arrangement of the contents of the shift register means as the next address in response to the second comparator output.

3. The apparatus of claim 2 wherein each sequence identification number has a reference value associated therewith, and wherein the means for providing a sequence identification number provides the reference value associated with the sequence identification number to the means for comparing.

4. The apparatus of claim 3 wherein the means for providing a sequence identification number is a counter which contains a count which is changed at commencement of each cycle of operation of the apparatus, and wherein the sequence identification number and the reference value are based upon the count.

5. The apparatus of claim 2 wherein the select means comprises:

means for routing the first arrangement of the contents of the shift register means to the means for storing in response to the first comparator output; and means for routing the second arrangement of the contents of the shift register means to the means for storing in response to the second comparator output.

6. The apparatus of claim 1 and further comprising:

means for loading a multibit word which is a function of the address of the selected sequence into the shift register means prior to shifting of the contents of the shift register means.

7. The apparatus of claim 6 wherein the means for loading comprises:

means for routing a first arrangement of bits of the address to the shift register means as the multibit word if the input data and a reference value have a first relationship; and means for routing a second arrangement of bits of the address to the shift register means as the multibit word if the input data and the reference value have a second relationship.

8. The apparatus of claim 1 and further comprising:

means for providing the address and the sequence identification number as an output of the apparatus, so that each address of the address stream has a sequence identification number associated therewith.

9. The apparatus of claim 1 wherein the means for storing comprises:

first storage means for storing an initial address for each sequence identification number to be used during a first cycle of operation for each sequence; and second read/write storage means for storing the next address selected for each sequence identification number.

10. The apparatus of claim 1 wherein the means for deriving comprises:

tap storage means for storing a digital word representative of the selected stages for each sequence identification number, the tap storage means being addressable by the sequence identification number; and means for routing bits from the selected stages to the means for feeding back based upon the digital word read from the tap storage means in response to the sequence identification number.

11. The apparatus of claim 10 wherein the means for feeding back comprises an exclusive-OR circuit for exclusive-ORing the bits from the selected taps to produce the feedback bit.

12. Apparatus for generating an address stream at an output which includes a plurality of interleaved sequences of addresses, the sequences of addresses being a function of input data received at an input in response to the address stream, the apparatus comprising:

sequence identification means for providing a sequence identification number which identifies one of the plurality of sequences;

storage means for storing an address for each sequence identification number;

output means for providing an address to the output;

shift register means for containing bits in a plurality of stages;

load means for loading a multibit word into the shift register means;

shift means for causing the shift register means to shift its contents by a predetermined number of stages;

tap means for deriving bits from selected stages of the shift register means, the selected stages being a function of the sequence identification number;

feedback means for providing a feedback bit of the shift register means during each shift of the contents by one stage, wherein the feedback bit is a function of the bits from the selected stages;

select means for selecting a next address of the sequence based upon the input data received in response to the address provided to the output and the contents of the shift register means after the shift by the predetermined number of stages; and control means for controlling the apparatus to generate the address stream during a series of operating cycles wherein during each cycle the control means causes the sequence identification means to provide a new sequence identification number; causes the stored address corresponding to the new sequence identification number to be provided by the output means to the output; causes the load means to load into the shift register means a multibit word which is a function of the stored address corresponding to the new sequence identification number; enables the shift means; and causes the next address selected by the select means to be stored in the storage means at the address corresponding to the sequence identification number.

13. The apparatus of claim 12 wherein the select means comprises:

comparator means for comparing the input data and a reference value and providing a first comparator output when the input data and the reference value have a first relationship and a second comparator output when the input data and the reference value have a second relationship; and means for selecting a first arrangement of the contents of the shift register means as the next address in response to the first comparator output and a second arrangement of the contents of the shift register means as the next address in response to the second comparator output.

14. The apparatus of claim 13 wherein each sequence identification number has a reference value associated therewith, and wherein during each cycle the sequence identification means provides to the comparator means the reference value associated with the sequence identification number in use during that cycle.

15. The apparatus of claim 14 wherein the sequence identification means is a counter which contains a count which is changed in response to the control means at commencement of each cycle, and wherein the sequence identification number and the reference value are based upon the count.

16. The apparatus of claim 13 wherein the means for selecting comprises:
first transceiver means for routing the first arrangement of the contents of the shift register means to the storage means in response to the first comparator output and a first direction control signal from the control means; and
second transceiver means for routing the second arrangement of the contents of the shift register means to the storage means in response to the second comparator output and the first direction control signal.

17. The apparatus of claim 16 wherein the load means comprises the first and second transceiver means, wherein the first transceiver means routes a first arrangement of the address from the storage means to the shift register means as the multibit word in response to the first comparator output and a second direction control signal from the control means, and wherein the second transceiver means routes a second arrangement of the address from the storage means to the shift register means as the multibit word in response to the second comparator output and the second direction control signal.

18. The apparatus of claim 12 wherein the output means also provides the sequence identification number to the output, so that each address of the address stream has a sequence identification number associated therewith.

19. The apparatus of claim 12 wherein the storage means comprises:
first storage means for storing an initial address for each sequence identification number to be used during a first cycle for each sequence; and
second read/write storage means for storing the next address selected by the select means for each sequence identification number.

20. The apparatus of claim 19 wherein the first storage means stores the initial addresses in locations which are addressable by their respective sequence identification numbers, and wherein the initial address stored in the location addressed by the sequence identification means is read out from the first storage means in response to a signal from the control means.

21. The apparatus of claim 19 wherein the second storage means stores the next addresses in locations which are addressable by their respective sequence identification numbers, and wherein the next address selected by the select means is written into the location addressed by the sequence identification means in response to a write enable signal from the control means.

22. The apparatus of claim 12 wherein the tap means comprises:
tap storage means for storing a digital word representative of the selected stages for each sequence identification number, the tap storage means being addressable by the sequence identification number; and
means for routing bits from the selected stages to the feedback means based upon the word read from the tap storage means in response to the sequence identification number.

23. The apparatus of claim 22 wherein the feedback means comprises an exclusive-OR circuit for exclusive-ORing the bits from the selected taps to produce the feedback bit.

24. Apparatus for generating a sequence of addresses, the apparatus comprising:
means for providing a multibit address;
means for providing input data in response to the multibit address;
shift register means for containing bits in a plurality of stages, the bits being related to the multibit address;
means for causing the shift register means to shift the bits by a predetermined number of stages;
means for loading a feedback bit into the shift register means each time the bits are shifted by one stage, wherein the feedback bit is a function of bits from selected stages of the shift register means, so that the contents of the shift register means after the shift are a function of the contents prior to the shift; and
means for selecting a next address in the sequence derived from the contents of the shift register means after the shift by a predetermined number of stages, wherein the means for selecting selects the next address from a plurality of possible next addresses which could be derived from the contents of the shift register means based upon a value of the input data.

25. The apparatus of claim 24 wherein the means for selecting comprises:
comparator means for comparing the input data and a reference value and providing a first comparator output when the input value and the reference value have a first relationship and a second comparator output when the input value and the reference value have a second relationship; and
means for selecting a first arrangement of the contents of the shift register means as the next address in response to the first comparator output and a second arrangement of the contents of the shift register means as the next address in response to the second comparator output.

26. A pattern processing system for identifying image input patterns, the system comprising:
addressable means for providing multibit grey scale values representative of an image input pattern at a plurality of addressable locations;
address sequencer means for providing an address stream which includes a plurality of interleaved sequences of addresses, wherein each next address of each sequence is determined by a present address of that sequence and the multibit grey scale value from the location corresponding to the present address of the sequence, the address sequencer means comprising:

means for periodically providing a sequence identification number which identifies a selected sequence of the plurality;

means for providing the present address of the selected sequence as part of the address stream based upon the sequence identification number;

means for periodically providing a reference value representative of one of a plurality of possible grey scale levels;

means for comparing the grey scale value with the reference value;

means for providing a next address of the selected sequence as a function of the present address and the comparison of the multibit grey scale value and the reference value; and means for storing the next address for use as the present address when the sequence identification number is again provided; and means responsive to the address stream for identifying image input patterns based upon address loops contained in the address stream which were caused by the image input pattern.

27. The system of claim 26 wherein the means for providing a next address comprises:

shift register means for containing bits in a plurality of stages, the bits being initially based upon the present address;

means for shifting the contents of the shift register means by a predetermined number of stages;

means for deriving bits from selected stages of the shift register means as a function of the sequence identification number;

means for feeding back a feedback bit into the shift register means, the feedback bit being a function of the bits derived from the selected stages; and means for selecting a next address in the selected sequence as a function of the comparison and the contents of the shift register means after the contents have been shifted by a predetermined number of stages.

28. The system of claim 27 wherein the means for comparing the grey scale value and the reference value provides a first comparator output when the grey scale value and the reference value have a first relationship and a second comparator output when the grey scale value and the reference value have a second relationship; and wherein the means for selecting a next address selects a first arrangement of the contents of the shift register means as the next address in response to the first comparator output and a second arrangement of the contents of the shift register means as the next address in response to the second comparator output.

29. The system of claim 27 wherein each sequence identification number has a reference value associated therewith, and wherein the means for providing a sequence identification number provides reference value associated with the sequence identification number to the means for comparing.

30. The system of claim 27 and further comprising:

means for loading a multibit word which is a function of the present address of the selected sequence into the shift register means prior to shifting of the contents of the shift register means.

31. The system of claim 30 wherein the means for loading comprises:

means for routing a first arrangement of bits of the address to the shift register means as the multibit word if the grey scale value and the reference value have a first relationship; and means for routing a second arrangement of bits of the address to the shift register means as the multibit word if the grey scale value and the reference value have a second relationship.

32. The system of claim 27 wherein the means for deriving comprises:

tap storage means for storing a digital word representative of the selected stages for each sequence identification number, the tap storage means being addressable by the sequence identification number; and means for routing bits from the selected stages to the means for feeding back based upon the digital word read from the tap storage means in response to the sequence identification number.

33. The system of claim 32 wherein the means for feeding back comprises an exclusive-OR circuit for exclusive-ORing the bits from the selected taps to produce the feedback bit.

34. The system of claim 26 wherein the means for storing comprises:

first storage means for storing an initial address for each sequence identification number to be used as the present address during a first cycle of operation for each sequence; and second read/write storage means for storing the next address produced for each sequence identification number.

35. The system of claim 26 and further comprising:

means for providing with each present address the sequence identification number which identifies the sequence of which the present address is a part so that each address of the address stream has a sequence identification number associated therewith.

* * * * *